Dec. 25, 1934.  H. C. HOLDERFIELD  1,985,450
LUBRICATING MEANS
Filed Sept. 6, 1933
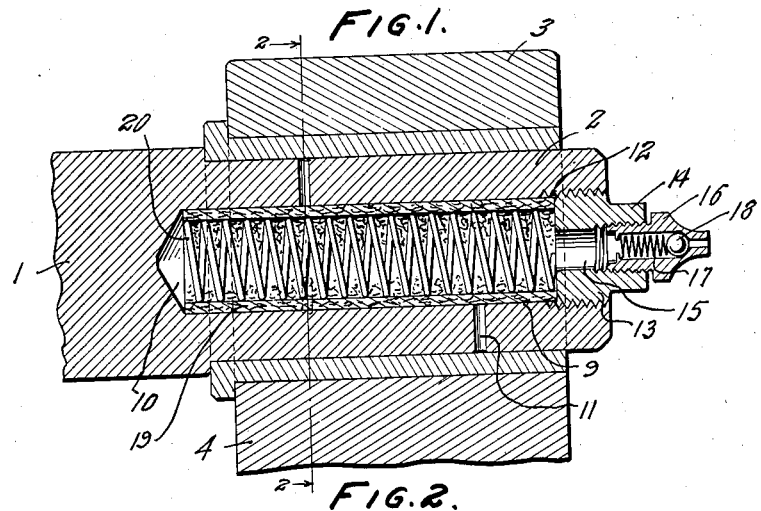
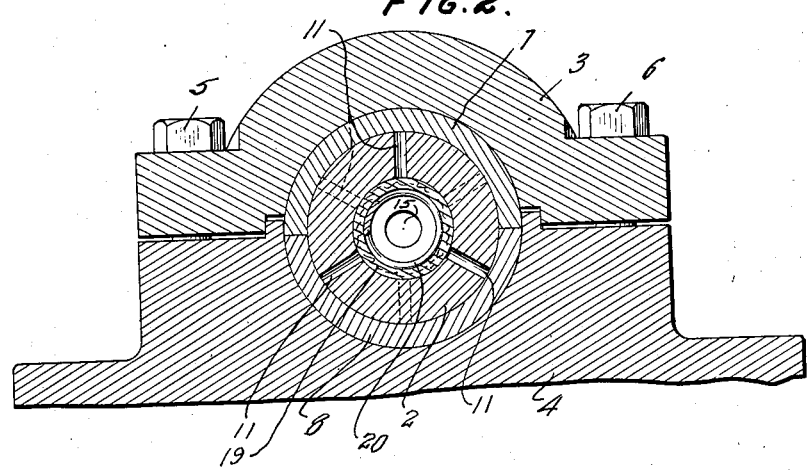
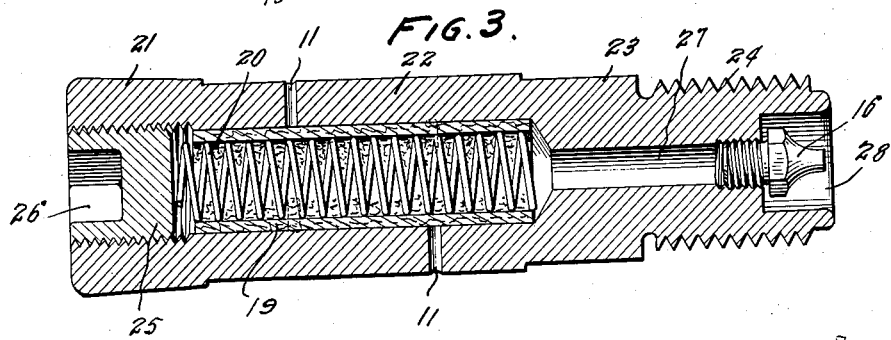
Inventor
H. C. HOLDERFIELD
By Semmes & Semmes
Attorneys Patented Dec. 25, 1934

1,985,450

UNITED STATES PATENT OFFICE 1,985,450

LUBRICATING MEANS

Horace C. Holderfield, Nashville, Tenn., assignor of forty-nine per cent to George I. Waddey, Nashville, Tenn.

Application September 6, 1933, Serial No. 688,403

3 Claims. (Cl. 308—121)

This invention relates in general to the lubrication of bearing surfaces and more particularly has reference to a journal lubricating device.

Previous to this time, when it has been desired to lubricate a journal continuously it has been customary to provide an oil reservoir in the journal bearing for feeding through apertures communicating with the bearing surface. Wicking has been employed in some instances to feed the oil by capillary attraction.

These prior arrangements for lubricating bearing surfaces have possessed the disadvantage of complicating the construction of journal bearings. Also, and of first importance, I have found that the lubricant is not as effectively distributed when thus fed from an immovable member, as when fed from a moving member so that the feed is positive in effect.

An object of this invention is to incorporate an oil reservoir in a moving journaled member for lubricating the bearing surfaces of the journal.

Another object of this invention is to incorporate an oil reservoir in a moving journal member for lubricating the bearing surfaces of the journal, which may be adapted to any moving member terminating adjacent the journal at one end without requiring basic modification in the form of the moving member.

Still another object of this invention is to incorporate an oil reservoir in a moving journaled member for lubricating the bearing surfaces of the journal, which may be readily refilled.

A further object of this invention is to incorporate an oil reservoir in a moving journaled member for lubricating the bearing surfaces of the journal, with provision therein for feeding the oil in suitable quantities, at a desirable rate, over an extended period without refilling.

With these and other objects in view, which may be incident to my improvements, the invention consists in the parts and combinations to be hereinafter set forth and claimed, with the understanding that the several necessary elements comprising my invention may be varied in construction, proportion and arrangement, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a sectional view from the side showing my invention adapted to an axle journal.

Fig. 2 is a sectional view taken on line 2—2 of Fig. 1.

Fig. 3 is a sectional view from the side of a pin having my invention incorporated therein.

It will be apparent from the foregoing, and as will be later described, that my invention is readily adaptable to locomotive journals, electric motors and dynamos, factory line shafts, steam shovels, derricks, trolley car harps, steam ships and in fact all working journals where continuous lubrication is desirable.

Referring more particularly by numerals to the drawing, in which the same and similar elements are designated by like symbols of reference throughout, and more especially to Fig. 1, there is shown a conventional shaft 1 terminating in a reduced extension 2 for fitting in an ordinary journal bearing embodying a cap 3 and pillow 4, as shown in Fig. 2. The cap is fixed on the pillow by nuts 5 and 6. The reduced extension 2 on the shaft is shown journaled in a split liner of Babbitt metal made up of sections 7 and 8 and having a collar at its inner end.

In accordance with my invention I contemplate providing the reduced extension 2 with an axial bore 9 which may terminate in a tapered seat 10. This bore is adapted to afford a reservoir for receiving and storing oil to lubricate the bearing surface of the journal. The oil is adapted to find exit from the reservoir for distribution on the bearing surface through radial conduits 11 communicating with the reservoir and opening on the periphery of the reduced extension 2. The conduits are suitably spaced and any number to afford sufficient lubrication provided.

The inner periphery of the bore 9 is threaded as at 12 adjacent the outer end for receiving a screw thread closure plug 13 having an extension 14 forming a nut thereon for engagement by a wrench or other suitable tool. The plug 13 is provided with a central bore 15, internally threaded adjacent the outer end for receiving a screw threaded nipple 16 containing the usual spring 17 and ball 18. The oil reservoir 9 is adapted to be filled with lubricant introduced through the nipple 16 with the use of a conventional filling appliance. The ball and spring, providing a one way valve, will prevent leakage of the oil.

In accordance with my invention further, I contemplate lining the bore 9 of the oil reservoir with some suitable material for absorbing oil, such as a layer of felt 19. The lining may be held in position in any suitable manner, for example by a helical spring 20.

The operation and advantage of my invention will be readily apparent from the foregoing description. The journal portion of a shaft may be formed as described in connection with the shaft 1, or a conventional shaft bored to provide the oil reservoir 9 and outlets 11. The liner 19 and retaining spring 20 are inserted therein and the plug 14 carrying the nipple 16 screwed in place. The oil reservoir is filled by introducing lubricant through the nipple 16.

The liner 20, which will become saturated with the oil fed into the reservoir, provides for regulating the quantity of and rate of flow of the oil through the conduits 11 to the bearing surfaces of the journal. The liner is held in position by the spring 20. The oil in the reservoir, different from lubricant in an immovable housing, will be forced outward through the conduits 11 by the centrifugal force set up by rotation of the shaft. When the oil in the reservoir becomes exhausted a sufficient amount will be retained in the liner to insure continued lubrication over a short period at least, until refilling is accomplished through the nipple 16.

In Fig. 3 I have shown my invention adapted to a pin 21 having a reduced extension 22 for journaling in a bearing and terminating in a reduced extension 23 threaded at the end as at 24, for receiving a securing nut. The pin is provided with the bore 9 for receiving the liner 19 and retaining spring 20, and also conduits 11. The bore is similarly threaded adjacent the open end at 12 for receiving a threaded plug 25, formed with a depression 26 on the top face for accommodating a suitable tool. A plug and nipple like 14 and 16 of Figure 1 may be substituted for the plug 25, or, as shown in Figure 3, the plug 25 may be employed and the pin provided with an axial bore 27 of reduced diameter, communicating with the bore 9 and opening in a depression 28 formed in the end of the pin. The bore 27 is threaded adjacent the outer end for receiving a nipple 16 like that already described.

My invention may thus be adapted to any type of working journal by providing an oil reservoir in a shaft or pin as described.

There is accomplished by this invention an oil reservoir in the moving member of a working journal for continuously and positively distributing lubricant in suitable quantities and at a desired rate on the bearing surfaces, which eliminates the modifications heretofore required in the immovable elements, and which may readily be adapted to existing constructions.

While I have shown and described the preferred embodiment of my invention, I wish it to be understood that I do not confine myself to the precise details of construction herein set forth, by way of illustration, as it is apparent that many changes and variations may be made therein by those skilled in the art without departing from the spirit of the invention, or exceeding the scope of the appended claims.

I claim:

1. A journaled member comprising a lubricant reservoir, means for allowing the passage of lubricant from the reservoir to the bearing surface of the member, a felt liner in the reservoir for absorbing lubricant for passage to the bearing surface, and a helical spring for maintaining the liner in position.

2. A journaled member comprising an axial bore opening at one end of the member, forming a lubricant reservoir, conduits communicating with the reservoir and the outer periphery of the member to allow the passage of lubricant to its bearing surface, a felt liner in the reservoir for absorbing lubricant for passage through the conduits, a helical spring for maintaining the liner in position, a removable closure for the reservoir, and a one way valve in the closure for introducing lubricant in the reservoir.

3. A journaled member comprising an axial bore opening at one end of the member and a communicating bore of reduced diameter opening at the other end, the first bore forming a lubricant reservoir, conduits communicating with the reservoir and outer periphery of the member to allow the passage of lubricant to its bearing surface, a felt liner in the reservoir for absorbing lubricant for passage through the conduits, a helical spring for maintaining the liner in position, a removable closure for the reservoir, and a one way valve mounted in the end of the reduced bore for introducing lubricant in the reservoir.

HORACE C. HOLDERFIELD.